(12) United States Patent
Fernandez et al.

(10) Patent No.: US 10,407,190 B2
(45) Date of Patent: Sep. 10, 2019

(54) METHOD FOR ARRANGING A PLURALITY OF SPACECRAFT UNDER THE FAIRING OF A LAUNCHER, ASSEMBLY RESULTING FROM SUCH A METHOD AND DISPENSER SUITED TO SUCH AN ASSEMBLY

(71) Applicant: THALES, Courbevoie (FR)

(72) Inventors: Gilles Fernandez, Toulouse (FR); Jean-Claude Sost, Toulouse (FR)

(73) Assignee: THALES, Courbevoie (FR)

( * ) Notice: Subject to any disclaimer, the term of this patent is extended or adjusted under 35 U.S.C. 154(b) by 191 days.

(21) Appl. No.: 15/097,943

(22) Filed: Apr. 13, 2016

(65) Prior Publication Data

US 2016/0304222 A1    Oct. 20, 2016

(30) Foreign Application Priority Data

Apr. 17, 2015   (FR) ...................................... 15 00801

(51) Int. Cl.
*B64G 1/64*     (2006.01)
*B64G 1/00*     (2006.01)
*B64G 1/10*     (2006.01)

(52) U.S. Cl.
CPC ............. *B64G 1/641* (2013.01); *B64G 1/002* (2013.01); *B64G 1/1085* (2013.01); *B64G 2001/643* (2013.01)

(58) Field of Classification Search
CPC ........ B64G 1/002; B64G 1/1085; B64G 1/64; B64G 1/641; B64G 2001/643
USPC ...................................................... 244/173.3
See application file for complete search history.

(56) References Cited

U.S. PATENT DOCUMENTS

| | | | | |
|---|---|---|---|---|
| 3,308,719 A | * | 3/1967 | Myers | ...................... B64D 1/06 102/393 |
| 3,611,931 A | * | 10/1971 | Bessey | ..................... F42B 12/62 102/393 |
| 3,726,223 A | * | 4/1973 | Moe | ......................... F42B 12/60 102/475 |
| 4,406,227 A | * | 9/1983 | Beeker | ..................... F42B 12/70 102/351 |
| 4,480,552 A | * | 11/1984 | Eckel | ...................... F24B 12/58 102/393 |
| 4,688,486 A | * | 8/1987 | Hall | ......................... F24B 12/60 102/393 |

(Continued)

*Primary Examiner* — Richard R. Green
*Assistant Examiner* — Brady W Frazier
(74) *Attorney, Agent, or Firm* — Baker & Hostetler LLP

(57) ABSTRACT

A method for arranging a plurality of spacecraft comprises the following steps: arranging a first layer of spacecraft around a dispenser; fixing the spacecraft of the first layer to the dispenser using mechanical interfaces extending in a radial direction; arranging a second layer of spacecraft around the first layer and the dispenser, the spacecraft of the second layer being arranged that they extend beyond, in a longitudinal direction of the fairing, the spacecraft of the first layer which are interposed between them and the dispenser; fixing the spacecraft of the second layer to the dispenser using mechanical interfaces extending in a radial direction over a distance greater than that of the mechanical interfaces of the first layer; and arranging the assembly thus obtained, under the fairing of a launcher. Assembly of spacecraft that can be obtained by the method and a dispenser suited to the assembly is provided.

9 Claims, 4 Drawing Sheets

(56) References Cited

U.S. PATENT DOCUMENTS

| | | | | |
|---|---|---|---|---|
| 4,744,533 A * | 5/1988 | Mullen | B64G 1/12 | |
| | | | 244/159.4 | |
| 5,052,640 A * | 10/1991 | Chang | B64G 1/002 | |
| | | | 136/292 | |
| 5,094,170 A * | 3/1992 | Raynaud | F42B 12/58 | |
| | | | 102/489 | |
| 5,199,672 A | 4/1993 | King et al. | | |
| 5,271,582 A * | 12/1993 | Perkins | B64G 1/22 | |
| | | | 244/159.4 | |
| 5,411,226 A * | 5/1995 | Jones | B64G 1/1085 | |
| | | | 244/173.3 | |
| 5,566,909 A * | 10/1996 | Lapins | B64G 1/105 | |
| | | | 244/173.3 | |
| 5,613,653 A * | 3/1997 | Bombled | B64G 1/641 | |
| | | | 244/173.1 | |
| 5,720,450 A * | 2/1998 | Kanne | B64G 1/641 | |
| | | | 244/118.1 | |
| 5,884,866 A * | 3/1999 | Steinmeyer | B64G 1/002 | |
| | | | 244/137.1 | |
| 6,138,951 A * | 10/2000 | Budris | B64G 1/002 | |
| | | | 102/393 | |
| 6,276,639 B1 * | 8/2001 | Hornung | B64G 1/002 | |
| | | | 102/489 | |
| 6,296,206 B1 * | 10/2001 | Chamness | B64G 1/00 | |
| | | | 244/173.3 | |
| 6,672,220 B2 * | 1/2004 | Brooks | F42B 12/60 | |
| | | | 102/357 | |
| 8,915,472 B2 * | 12/2014 | Aston | B64G 1/002 | |
| | | | 244/171.1 | |
| 2006/0038085 A1 * | 2/2006 | Duden | B64G 1/002 | |
| | | | 244/173.3 | |
| 2015/0083865 A1 * | 3/2015 | Nakasone | B64G 1/242 | |
| | | | 244/158.6 | |
| 2015/0375875 A1 * | 12/2015 | Dula | B64G 1/002 | |
| | | | 244/171.3 | |

\* cited by examiner

US 10,407,190 B2

METHOD FOR ARRANGING A PLURALITY OF SPACECRAFT UNDER THE FAIRING OF A LAUNCHER, ASSEMBLY RESULTING FROM SUCH A METHOD AND DISPENSER SUITED TO SUCH AN ASSEMBLY

CROSS-REFERENCE TO RELATED APPLICATION

This application claims priority to foreign French patent application No. 1500801, filed on Apr. 17, 2015, the disclosure of which is incorporated by reference in its entirety.

FIELD OF THE INVENTION

The invention relates to the astronautical field and more particularly to the launch of spacecraft such as artificial satellites. More particularly it relates to a method for arranging a plurality of spacecraft under the fairing (or nosecone) of a launcher, to an assembly that may result from such a method and to a spacecraft dispenser suited to the creation of such an assembly.

The invention notably applies to the simultaneous launch of a plurality of artificial satellites intended to form a constellation.

BACKGROUND OF THE INVENTION

In order to create constellations comprising a great many identical artificial satellites of small dimensions (mass typically less than 500 kg, or even 200 kg), it is known practice to perform grouped launches. Several satellites, or even several tens of satellites in some instances, have therefore to be arranged under the fairing of one and the same launcher so that they can be put into orbit simultaneously. These satellites are fixed to a "dispenser" which is a tubular element placed along the axis of the fairing of the launcher and equipped with mechanical interfaces for anchoring the satellites; this then yields a rigid assembly that may be considered to constitute the payload of the launcher. Out in space, after this assembly has been released, pyrotechnic charges detach the satellites from the dispenser. In addition, spring-loaded "ejection fingers" incorporated into the mechanical interfaces apply thrust to the satellites in a radial direction, so as to disperse the cluster of satellites that has just been released.

FIG. 1 shows an assembly of satellites SAT under the fairing CL of a launcher according to the prior art. The dispenser D has a cylindrical shape, with an axis z coinciding with the longitudinal axis of the fairing. The satellites are arranged on the surface of the dispenser where they form a plurality of stages E1, E2, E3, E4 that are aligned in the axial, or longitudinal, direction. Each stage is made up of a ring of satellites—18 in the example considered—surrounding the dispenser. The satellites of the various stages are aligned in the longitudinal direction, although that is not essential. In the example of FIG. 1, radial partitions are provided to separate the satellites of each stage, but that is optional.

The arrangement of FIG. 1 allows the grouped launch of 72 satellites, provided that they are small enough in volume to comply with the fairing size constraints. In the case of a Falcon 9 launcher, that presupposes that the dimensions of each satellite do not exceed 1000×500×500 mm. If the satellites are larger in size, then the number of them has to be reduced which means that, for a given constellation, the number of launches has to be increased, leading to a very substantial increase in cost.

Other assemblies of satellites under fairings are described, inter alia, by documents U.S. Pat. No. 5,199,672 and U.S. Pat. No. 5,271,582. They have the same disadvantage as the assembly of FIG. 1, namely somewhat inefficient use of the storage volume available.

SUMMARY OF THE INVENTION

The invention seeks to allow more efficient use of the volume available under the fairing, and therefore to increase the number of satellites that can be launched simultaneously or—which is equivalent—to relieve the constraints on the dimensions thereof.

According to the invention, this objective is achieved by arranging the satellites in two layers around the dispenser and by using a modified dispenser having mechanical interfaces of at least two different types that differ in terms of their radial extension.

Thus, one subject of the invention is a method for arranging a plurality of spacecraft under the fairing of a launcher, comprising the following steps:
  arranging a first layer of spacecraft around a dispenser having a longitudinal axis;
  fixing the spacecraft of the said first layer to the said dispenser using mechanical interfaces extending in a radial direction;
  arranging a second layer of spacecraft around the said first layer and the said dispenser, the spacecraft of the said second layer being arranged in such a way that they extend beyond, in a longitudinal direction of the said fairing, the spacecraft of the first layer which are interposed between them and the dispenser;
  fixing the spacecraft of the said second layer to the said dispenser using mechanical interfaces extending in a radial direction over a distance greater than that of the mechanical interfaces of the first layer; and
  arranging the assembly thus obtained, comprising the dispenser and the spacecraft, under the fairing of a launcher with the longitudinal axis of the dispenser aligned with that of the fairing.

According to particular embodiments of such a method:
  both the said first layer and the said second layer may comprise a plurality of stages spaced in a longitudinal direction of the dispenser, each said stage being made up of a plurality of spacecraft arranged in a ring around the said dispenser, each stage of the said second layer surrounding a corresponding stage of the said first layer.

The said spacecraft may be substantially mutually identical, the spacecraft of the second layer being angled, with respect to those of the first layer, around respective radially-oriented axes. More particularly, the said spacecraft may have a shape that is elongate along an axis referred to as the main axis and the spacecraft of the first layer may be arranged with their main axis oriented in a longitudinal direction of the dispenser and those of the second layer be arranged with their main axis oriented perpendicular to the longitudinal direction of the dispenser.

Another subject of the invention is an assembly of spacecraft comprising a first set of spacecraft arranged around a dispenser having an axis referred to as the longitudinal axis to form a first layer of spacecraft, the said spacecraft being fixed to the said dispenser by means of mechanical interfaces extending in a radial direction from the said dispenser;

characterized in that it also comprises a second set of spacecraft arranged around the said first layer and the said dispenser to form a second layer of spacecraft, the spacecraft of the said second layer being arranged so that they extend beyond, in the direction of the said longitudinal axis, the spacecraft of the first layer which are interposed between them and the dispenser and being fixed to the said dispenser by means of mechanical interfaces extending in the said radial direction over a distance of greater than that of the mechanical interfaces of the first layer.

According to particular embodiments of such an assembly:

both the said first layer and the said second layer of spacecraft may comprise a plurality of stages spaced in the direction of the said longitudinal axis of the dispenser, each said stage being made up of a plurality of spacecraft arranged in a ring around the said dispenser, each stage of the said second layer surrounding a corresponding stage of the said first layer.

The said spacecraft may be substantially mutually identical, the spacecraft of the second layer being angled, with respect to those of the first layer, around respective radially-oriented axes. More particularly, the said spacecraft may have a shape that is elongate along an axis referred to as the main axis and the spacecraft of the first layer may be arranged with their main axis oriented in a longitudinal direction of the dispenser and those of the second layer be arranged with their main axis oriented perpendicular to the longitudinal direction of the dispenser.

Yet another subject of the invention is a dispenser of spacecraft suited to implementation of such a method and for creating such an assembly, comprising a central body of a shape that is elongate along an axis referred to as the longitudinal axis, and a plurality of mechanical interfaces for anchoring spacecraft extending radially from the said central body, the said mechanical interfaces being arranged in stages spaced longitudinally, characterized in that it has an alternation of sets of stages of mechanical interface extending radially over a first distance and of sets of stages of mechanical interfaces extending radially over at least a second distance greater than the said first distance.

BRIEF DESCRIPTION OF THE DRAWINGS

Further features, details and advantages of the invention will become apparent from reading the description given with reference to the attached drawings which are provided by way of example and which respectively depict.

DETAILED DESCRIPTION

In what follows, a "longitudinal direction" (or "longitudinal axis") will mean a direction (and, respectively, an axis), that is parallel to the axis of the dispenser (and of the fairing) and therefore to the direction of travel of the launcher. A "radial direction" will mean the direction of a line starting from the axis of the dispenser and extending perpendicular to the longitudinal direction.

The term "spacecraft" may denote an artificial satellite or any other vehicle intended to move around in space, such as a planetary space probe. In what follows, the terms "satellite" and "spacecraft" will be used interchangeably.

Figure 2A:
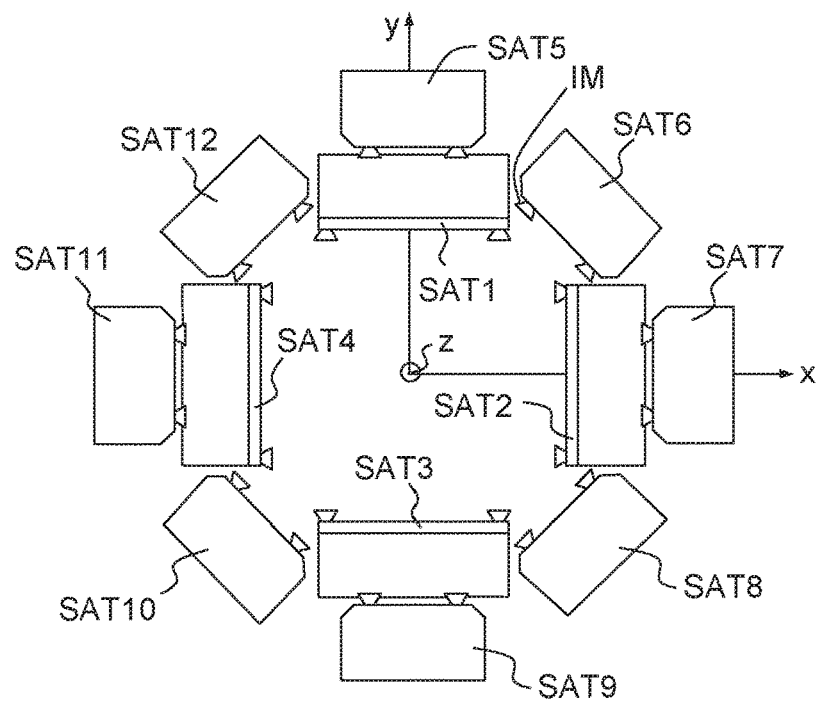
FIGS. 2A and 2B: one stage of an assembly of spacecraft according to one embodiment of the invention.
Figure 2B:
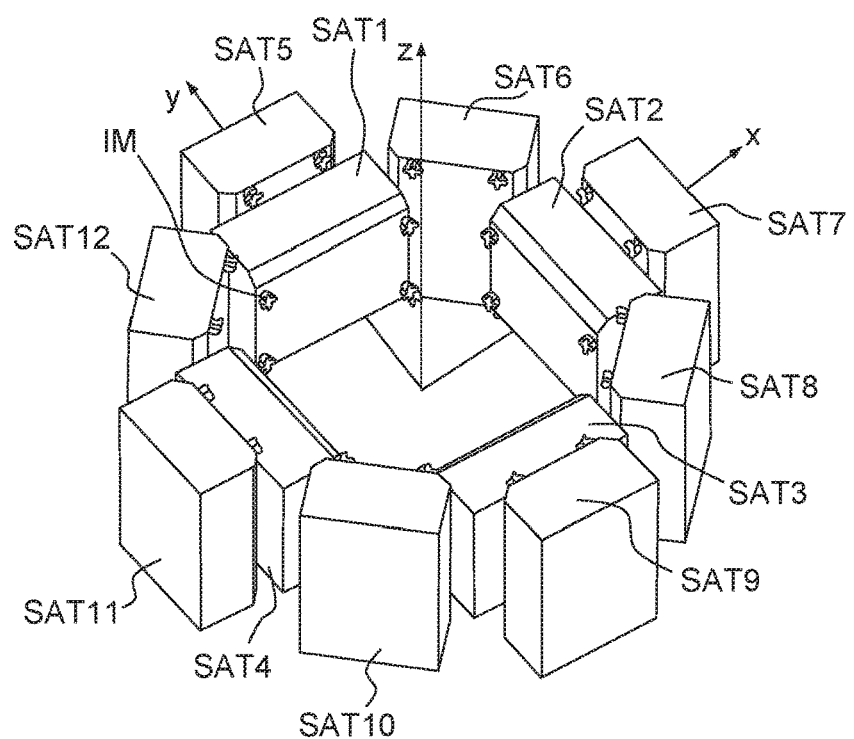

FIGS. 2A and 2B are, respectively, a plan view and an elevation view of a stage that makes up an assembly of spacecraft according to one embodiment of the invention. This stage comprises 12 spacecraft—typically satellites—that are identical, and denoted by the references SAT1 to SAT12. These satellites have an elongate shape, approximately in the shape of a straight brick. In order to avoid overloading the figures, the dispenser has not been depicted. It may be seen that the satellites are arranged so that they form two concentric rings: an inner ring, formed by the satellites SAT1 to SAT4, which are arranged with their main dimension (which means to say their longest side) oriented in a direction referred to as tangential, which is perpendicular both to the axis z of the fairing and to a radial direction of the plane x, y; and an outer ring, formed by the satellites SAT5 to SAT12, which are arranged with their main direction oriented in a longitudinal direction, which means to say parallel to the axis z. In other words, the satellites of the outer ring are angled by 90° about a radially oriented axis with respect to those of the inner ring. This angling allows the satellites of the outer ring to be fixed to the dispenser by mechanical interfaces IM—depicted only in part in FIGS. 2A and 2B and more fully in FIGS. 3A and 3B. Specifically, since their main dimension extends in a longitudinal direction, their mechanical interfaces can pass "above" and "below" the satellites of the inner ring the longitudinal direction of which extends in a plane x-y that is perpendicular to this longitudinal direction.

Figure 1:
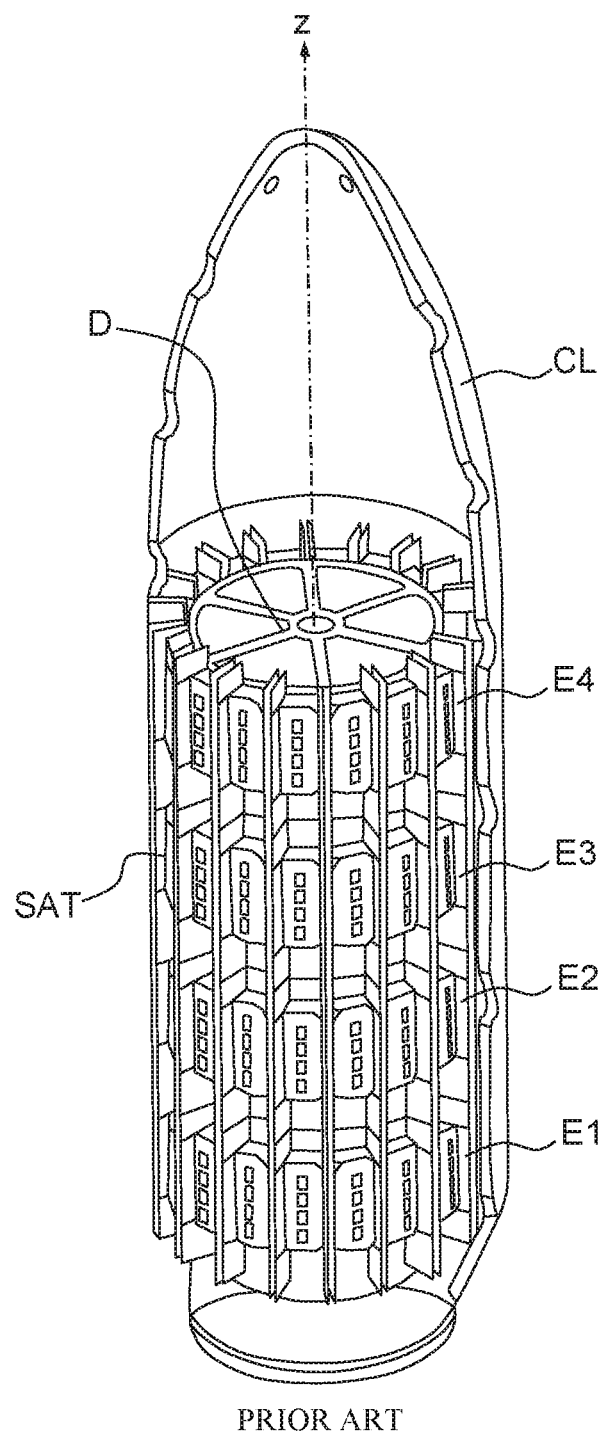
FIG. 1, described above: an assembly of spacecraft under a fairing according to the prior art.

As in the case of FIG. 1, an arrangement of spacecraft according to the invention may comprise a plurality of stages—generally, although not necessarily, identical—spaced in the longitudinal direction (axis z); in some cases, however, the arrangement may comprise a single stage. Thus, a layer of satellites is generally formed by a plurality of rings of the same rank spaced along the axis z, but may sometimes be made up of a single ring of a single stage.

Figure 3A:
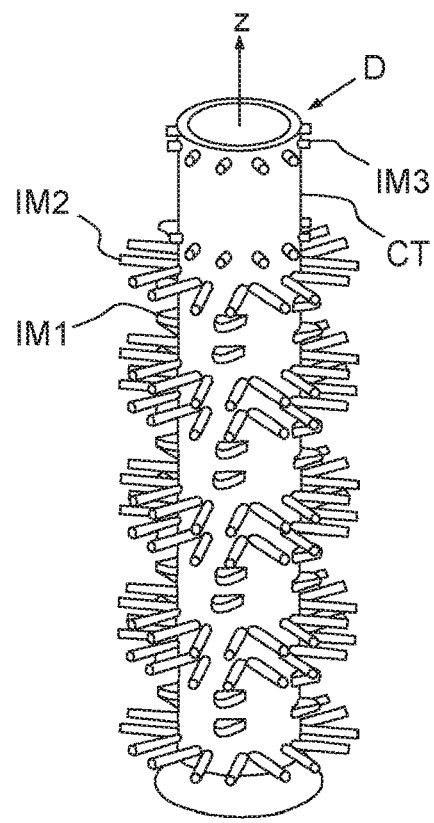
FIGS. 3A and 3B: a spacecraft dispenser according to one embodiment of the invention.
Figure 3B:
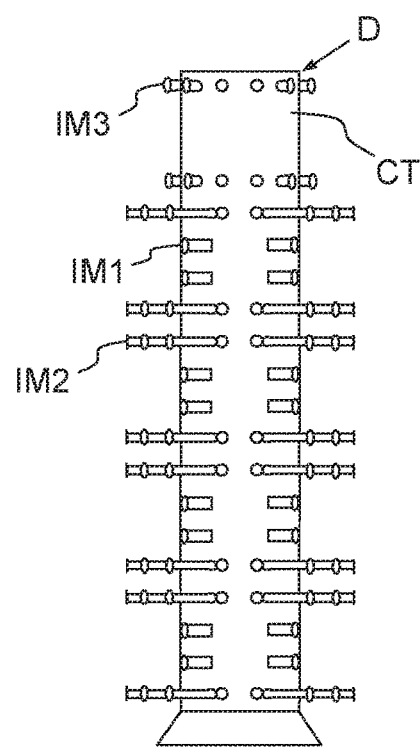

FIGS. 3A and 3B are, respectively, elevation and front views of a dispenser D suited to implementation of the invention. This dispenser comprises a tubular body CT, the axis z of which is intended to be aligned with that of the fairing of the launcher, to the surface of which body are fixed mechanical interfaces extending in a radial direction. These interfaces are of three types: the interfaces IM1 extend in the radial direction over a relatively short distance—typically a few centimeters: they are in fact intended for fixing the satellites of the first layer (SAT1 to SAT4 in the embodiment of FIGS. 2A, 2B); the interfaces IM2 extend in the radial direction over a greater distance, typically several decimeters: in fact they are intended for fixing the satellites of the second layer (SAT5 to SAT12 in the embodiment of FIGS. 2A, 2B). It will be appreciated, from studying FIGS. 3A and 2B, that the radial extension of the interfaces IM2 is at least equal to that of the interfaces IM1 plus the length of the side of the satellites extending in the radial direction (the shortest side in the embodiment of FIGS. 2A and 2B). Thus, the interfaces IM2 are in the form of rods. Apart from that, they may be entirely conventional and notably comprise a pyrotechnic satellite-release device and an ejection finger. It is important to note that the interfaces IM2 do not necessarily all need to be the same length, even though their being so simplifies the manufacture of the dispenser. For example, in the embodiment of FIGS. 2A and 2B, the mechanical interfaces IM2 associated with the satellites SAT5, SAT7, SAT9 and SAT11 may be slightly longer than those associated with the satellites SATE, SAT8, SAT10 and SAT12. The interfaces IM3, which may be similar or identical to the interfaces IM1, are used for creating the highest stages of the assembly, which will be described with reference to FIGS. 4A and 4B.

The staged structure of the assembly is reflected in the arrangement of the mechanical interfaces IM1 and IM2. Thus it is possible on the dispenser of FIGS. 3A and 3B to identify an alternation of sets of stages of mechanical interfaces IM1 and IM2. More particularly, in the embodiment considered (see FIGS. 2A and 2B) each satellite is fixed using four mechanical interfaces corresponding to the corners of its rectangular face facing towards the dispenser. Thus, the dispenser D has, except at the ends, an alternation of two stages of interface IM1—twice as many as there are satellites in each stage of the inner layer—and two stages of interface IM2—twice as many as there are satellites in each stage of the internal layer.

Figure 4A:
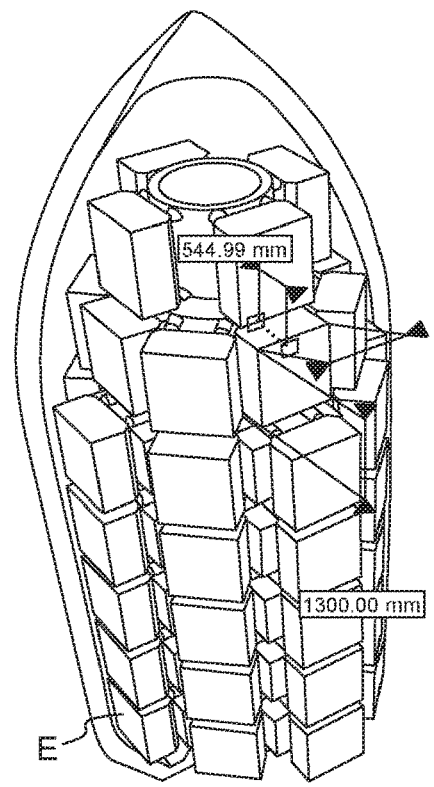
FIGS. 4A and 4B: two assemblies of spacecraft according to respective embodiments of the invention.

FIG. 4A illustrates an assembly according to a first embodiment of the invention, which can be housed under the fairing of a Falcon 9 launcher. This assembly comprises 6 stages (reference E) of 12 satellites having the structure illustrated in FIGS. 2A and 2B, plus a stage of conventional type, having a single layer, comprising 4 satellites fixed by the interfaces IM3 and housed in the narrower upper part of the fairing. It is thus possible simultaneously to launch up to 76 satellites the dimensions of which may be as much as 1300×980×545 mm—which is a volume more than twice that of the satellites of the assembly of FIG. 1.

Figure 4B:
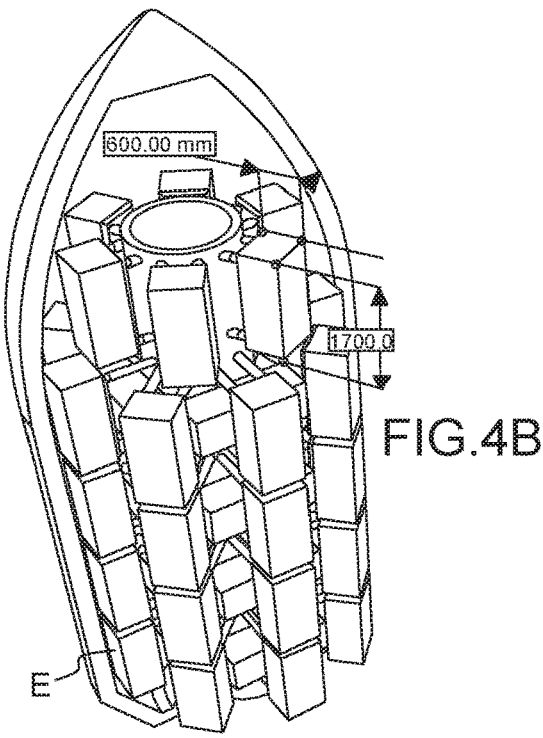

FIG. 4B illustrates an assembly according to a second embodiment of the invention, which can also be housed under the fairing of a Falcon 9 launcher. This assembly comprises 4 stages (reference E) of 12 satellites having the structure illustrated in FIGS. 2A and 2B plus one stage with a layer of 6 satellites, which are fixed by the interfaces IM3, which is housed in the narrower upper part of the fairing. It is thus possible simultaneously to launch up to 54 satellites, and their dimensions may be as much as 1700×780×600 mm—which is a volume more than three times that of the satellites of the assembly of FIG. 1.

The satellites may be released as in the prior art; it is merely necessary to ensure that the pyrotechnic devices that break the mechanical interfaces IM2 of the outer layer are initiated before those of the mechanical interfaces IM1 of the inner layer.

The invention has been described with reference to some particular embodiments but its scope is more general. In particular:

The invention is in general suited to the arrangement under a fairing, with a view to the simultaneous launch of a plurality of spacecraft—typically although not necessarily satellites. It is not essential for these spacecraft to be mutually identical or for them to be intended to form a constellation. They may have shapes that differ from those of the embodiments described and it is not always necessary for the spacecraft of the second layer to be angled by 90° with respect to those of the first layer: that will depend on the shape of the said spacecraft. For example, if the spacecraft are in the form of a straight brick with a square base and a square face oriented towards the dispenser, there would be no benefit in angling them by 90°, although angling them by 45° would be suitable. This idea of angling loses its benefit if the spacecraft of the second layer are different in shape or size from those of the first layer. Moreover, the various stages may be angularly offset; in other words, each stage, or just some of the stages, may be angled by a non-zero angle about the axis z with respect to the adjacent stages.

The coaxial layers of spacecraft may have structures different from those described. In particular, the number of spacecraft in each stage and in the entire assembly may differ from that of the examples described with reference to FIGS. 2A/2B and 4A/4B.

The dispenser may have a structure different from that described with reference to FIGS. 3A and 3B.

In the embodiments described, the spacecraft are arranged over exactly two layers; however, the scope of the invention is more general and comprises all arrangements comprising at least two layers. Indeed, in some cases it may be possible and opportune to use an arrangement over three, or even more, coaxial layers. In that case the spacecraft of the various layers will be fixed to the dispenser with mechanical interfaces extending over radial distances that increase with the order of the layer.

The invention claimed is:

1. A method for arranging a plurality of spacecraft under a fairing of a launcher, comprising the steps of:
    arranging a first layer of spacecraft around a dispenser having a longitudinal axis;
    fixing the spacecraft of the first layer to the dispenser using mechanical interfaces extending in a radial direction of the dispenser;
    arranging a second layer of spacecraft around the first layer and the dispenser, the spacecraft of the second layer being arranged in such a way that they extend beyond, in a longitudinal direction of the fairing, the spacecraft of the first layer which are interposed between them and the dispenser such that the entirety of at least one spacecraft of the first layer of spacecraft is interposed between the dispenser and the second layer of spacecraft;
    fixing the spacecraft of the second layer to the dispenser using mechanical interfaces extending in the radial direction over a distance greater than that of the mechanical interfaces of the first layer; and
    arranging the assembly thus obtained, comprising the dispenser and the spacecraft, under the fairing of the launcher with the longitudinal axis of the dispenser aligned with the longitudinal axis of the fairing.

2. The method of claim 1, wherein both the first layer and the second layer comprise a plurality of stages spaced in a longitudinal direction of the dispenser, each stage being made up of a plurality of spacecraft arranged in a ring around the dispenser, each stage of the second layer surrounding a corresponding stage of the first layer.

3. The method of claim 1, wherein the spacecraft are substantially mutually identical, the spacecraft of the second layer being angled, with respect to those of the first layer, around respective radially-oriented axes.

4. The method of claim 3, wherein
    the spacecraft have a shape that is elongate along a main axis and
    the spacecraft of the first layer are arranged with their main axis oriented perpendicular to a longitudinal direction of the dispenser and those of the second layer are arranged with their main axis oriented in the longitudinal direction of the dispenser and perpendicular to the radial direction of the dispenser.

5. An assembly of spacecraft comprising:
    a dispenser having a longitudinal axis;

a first set of spacecraft arranged around the dispenser to form a first layer of spacecraft, the spacecraft being fixed to the dispenser by mechanical interfaces extending from the dispenser in a radial direction of the dispenser; and a second set of spacecraft arranged around the first layer and the dispenser to form a second layer of spacecraft, the spacecraft of the second layer being arranged so that they extend beyond, in the direction of the longitudinal axis, the spacecraft of the first layer which are interposed between them and the dispenser such that the entirety of at least one spacecraft of the first layer of spacecraft is interposed between the dispenser and the second layer of spacecraft, and the second set of spacecraft being fixed to the dispenser by mechanical interfaces extending in the radial direction over a distance greater than that of the mechanical interfaces of the first layer.

6. The assembly of claim 5, wherein both the first layer and the second layer of spacecraft comprise a plurality of stages spaced in the direction of the longitudinal axis of the dispenser, each stage being made up of a plurality of spacecraft arranged in a ring around the dispenser, each stage of the second layer surrounding a corresponding stage of the first layer.

7. The assembly of claim 5, wherein the spacecraft are substantially mutually identical, the spacecraft of the second layer being angled, with respect to those of the first layer, around respective radially-oriented axes.

8. The assembly of claim 7, wherein
the spacecraft have a shape that is elongate along a main axis, and
the spacecraft of the first layer are arranged with their main axis oriented perpendicular to a longitudinal direction of the dispenser and those of the second layer are arranged with their main axis oriented in the longitudinal direction of the dispenser and perpendicular to the radial direction of the dispenser.

9. A dispenser of spacecraft that implements the method of claim 1, comprising:
a central body of a shape that is elongate along a longitudinal axis, and
a plurality of mechanical interfaces for anchoring spacecraft extending radially from the central body, the mechanical interfaces being arranged in stages spaced longitudinally, wherein
the dispenser has an alternation of sets of stages of mechanical interfaces extending radially over a first distance and of sets of stages of mechanical interfaces extending radially over at least a second distance greater than the first distance.

* * * * *